United States Patent [19]

Pichler et al.

[11] Patent Number: 4,861,946
[45] Date of Patent: Aug. 29, 1989

[54] CABLE SLEEVE HAVING END MEMBERS AND A SLEEVE MEMBER WITH AT LEAST ONE LONGITUDINALLY EXTENDING SLOT

[75] Inventors: Klaus Pichler, Otterfing; Dieter Kunze, Neuried, both of Fed. Rep. of Germany

[73] Assignee: Siemens Aktiengesellschaft, Berlin and Munich, Fed. Rep. of Germany

[21] Appl. No.: 208,528

[22] Filed: Jun. 20, 1988

[30] Foreign Application Priority Data

Jul. 2, 1987 [DE] Fed. Rep. of Germany ....... 3721935

[51] Int. Cl.⁴ .......................................... H02G 15/113
[52] U.S. Cl. ...................... 174/92; 138/158; 138/167; 174/93
[58] Field of Search ................... 174/92, 93; 138/158, 138/162, 166, 167, 169; 403/313

[56] References Cited

U.S. PATENT DOCUMENTS

| 3,583,424 | 8/1968 | Bryant | 138/166 X |
| 4,087,190 | 5/1978 | Haeder | 174/92 X |
| 4,181,814 | 1/1980 | Smith | 174/93 X |
| 4,715,740 | 12/1987 | Pichler | 174/92 X |
| 4,733,019 | 3/1988 | Pichler et al. | 174/92 |

FOREIGN PATENT DOCUMENTS 3336425  4/1985  Fed. Rep. of Germany ........ 174/92

Primary Examiner—Morris H. Nimmo

[57] ABSTRACT

A cable sleeve having end members and a sleeve member having at least one longitudinally extending slot and a clamping device for closing said slot and holding the sleeve member in sealing engagement on said end members. The cable sleeve further includes a gripping arrangement for prevent the spreading apart of the ends of the slot. This arrangement includes the sleeve member having inwardly directed segment-like flanges adjacent each edge of the slot and an arrangement for holding the two flanges together including a stiffening element that extends across the slot and is connected to each of the flanges on each side of the slot.

15 Claims, 3 Drawing Sheets 4,861,946

CABLE SLEEVE HAVING END MEMBERS AND A SLEEVE MEMBER WITH AT LEAST ONE LONGITUDINALLY EXTENDING SLOT

BACKGROUND OF THE INVENTION

The present invention is directed to a cable sleeve having end sealing members and having a sleeve member having at least one longitudinally extending slot with means for pressing the edges of the slot together to form a seal therebetween and to form a seal with the end members, which means can include clamping rails.

U.S. Pat. No. 4,733,019, whose disclosure is incorporated by reference thereto and which claims priority from German Application No. 35 36 599, discloses a longitudinally divided cable sleeve that has wedge-shaped beads along the longitudinal slot and the edges of the slot are drawn together by closure rails which have a corresponding wedge shape. In cable sleeves that are then exposed to internal pressure and may also be exposed to different temperatures, it is possible for the edges of the sleeve to become unlatched in an outward direction in the region of the parting line so that a loss of tightness can occur.

SUMMARY OF THE INVENTION

The object of the present invention is to provide a cable sleeve which has means for preventing the long edges of the parting lines from becoming separated or being tilted apart adjacent the ends of the sleeve member.

To obtain this object, the present invention is directed to an improvement in a cable sleeve having a sleeve member having longitudinal edges forming at least one longitudinally extending slot and a pair of end members and clamping means for clamping the longitudinal slot closed and for clamping the sleeve member onto the seals of each of the end member. The improvement comprises the sleeve member having projecting segment-like flanges at each end adjacent each edge of the longitudinal slot and fixing means including a stiffening element extending across a gap between adjacent flanges for engaging the flanges and holding the flanges in a closed anchored position to prevent a separating of the edges of the slot at each end of the cable sleeve.

The advantage of the invention is particularly seen in that it prevents the edges of the slot of a sleeve member from separating adjacent the end region due to changes in the shape of the cable sleeve. As a consequence of the inventive fixing of the ends of the edges of the slot, a constant pressing over the entire circumference of the inserted seals is always established so that a uniform sealing condition is obtained between the intersecting regions of the round seal on the end members and the longitudinal seal in the slot of the sleeve member. The same pressing conditions are, thus, also present in these critical cross over regions and a shape change or, respectively, volume change of the cross over region is thereby no longer possible. This is also true given changing temperature conditions, since the edges of the sleeve member are retained in position relative to one another by the fixing means.

In addition, the improvement of the present invention can also be employed given a multiply divided sleeve member, for example in sleeves composed of half-shells as well. However, such inventive apparatus in the form of flanges and of the appertaining stiffening member for bridging the gap will be situated at the end of each of the slots or parting lines between the half-shells.

The improvements of the present invention will maintain the sealing condition for plastic cable sleeves having flexible sealing elements, wherein an internal pressure of 0.7 bar and an ambient temperature in the range of −40° C. to +60° C. is present. As a result of the improvement of the present invention, the cross over or gore regions at the intersecting points of the seals remain unaltered in shape so that no longitudinally directed leaks can occur.

Other advantages and features of the invention will be readily apparent from the following description of the preferred embodiments, the drawings and the claims.

DESCRIPTION OF THE PREFERRED EMBODIMENTS

Figure 1:
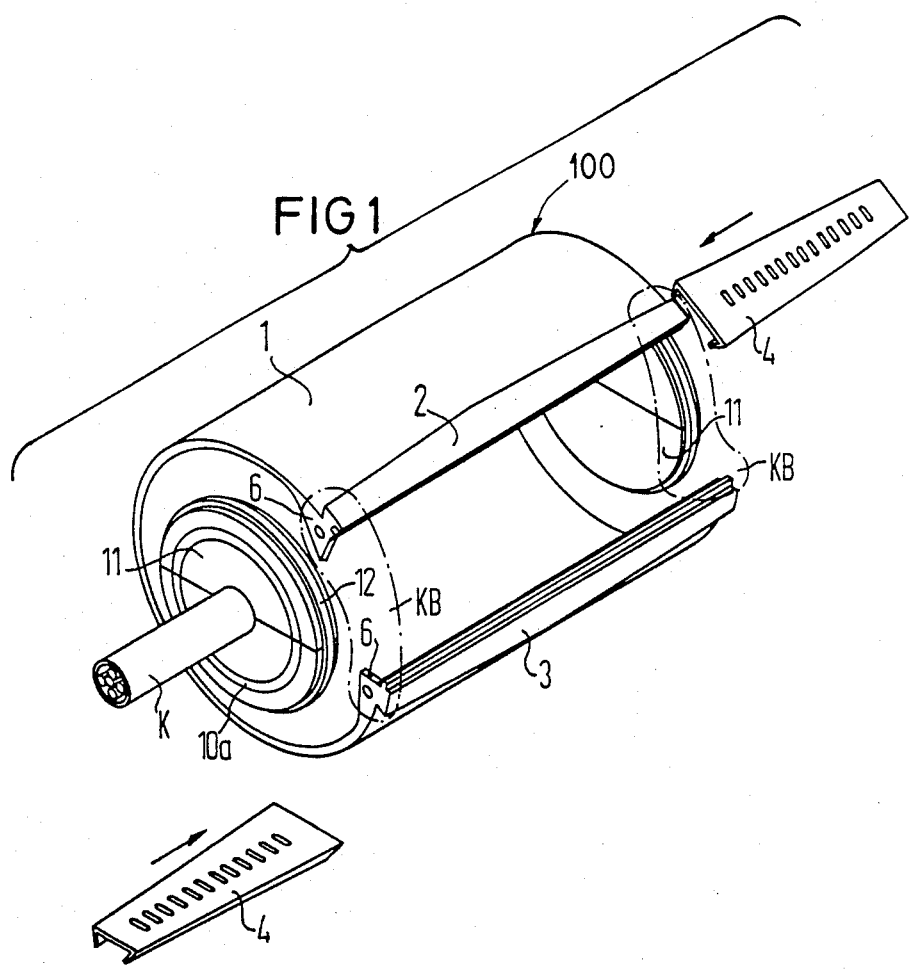
FIG. 1 is a perspective view of the cable sleeve in accordance with the present invention.

The principles of the present invention are particularly useful when incorporated in a cable sleeve, generally indicated at 100 in FIG. 1. The cable sleeve 100 includes a sleeve member 1 illustrated as having a single longitudinally extending slot with wedge-shaped beads 2 and 3 along both edges of the slot. To close the cable sleeve and the slot, corresponding closing rails 4 are drawn over the wedge-shaped beads 2 and 3 to such an extent that they will form a seal between the beads or edges. At both ends of the sleeve member 1, end members 11 are provided and, as illustrated, have annular seals 12. As illustrated, each of the end members 11 is formed of two members and has an opening for receiving a cable, such as the cable K.

According to the present invention, a critical region KB are at the respective ends of each of the longitudinal edges of the sleeve member 1 and these end portions are provided with segment-like flanges 6 which extend radially inwardly. Also according to the invention, fixing means are provided for drawing the two flanges 6 together to hold them in this fixed position, which lies under the possible transition point and under the parting line between the end members 11 and the sleeve member 1. These flanges are each provided with holes or openings and the fixing means has projection or pins which are received in these holes. In this way, it is no longer possible for an outwardly directed separation of the longitudinal edges of the sleeve member 1 to occur and, as a result, leaks which would ultimately form in the longitudinal direction in this region will not occur.

Figure 2:
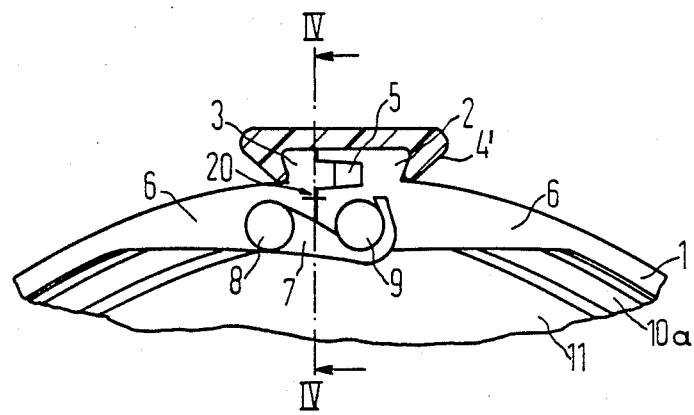
FIG. 2 is an end view of the cable sleeve of FIG. 1 with a clamping rail in cross section.

The two flanges 6 are best illustrated in FIG. 2 and have a segment-like configuration that extends radially inward. The fixing means, which is in the form of two pins 8 and 9, are inserted into the holes of the flanges 6 and support a stiffening element in the form of a bolt 7, which is held by the pin 8 to one of the flanges 6. After the closing of the slot, for example after a closing rail 4' has been completely drawn onto the beads 2 and 3, the second pin 9 is surrounded or engaged by the hook-like end of the bolt 7 so that it is pressed into an easily interlocking fashion and, thus, is no longer self-releasing. It can be seen that the pins 8 and 9 of the fixing means lie substantially under the parting line between the sleeve member 1 and the end member 11, such as at a transition point 20. It may be seen in this way that the separation of the longitudinal edges or beads 2 and 3 of the sleeve member 1 is no longer possible since the anchoring by the bolt 7 no longer allows the outwardly directed movement of the longitudinal edges that would lead to this separation.

As illustrated in FIG. 2, the bead 2 has a longitudinally extending groove that receives a projection from the bead 3. A sealing element, such as 5, is introduced in this groove and is in a clamped, compressed sealing position when the rail, such as 4', has been moved onto the beads to cause a closing of the longitudinal gap.

Figure 3:
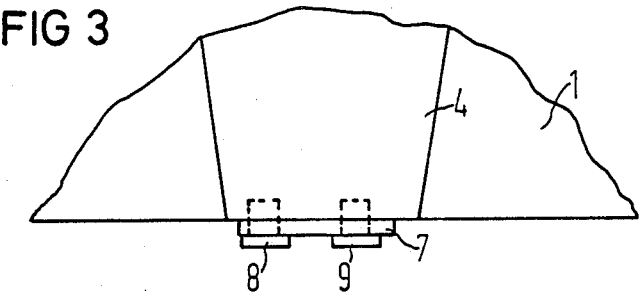
FIG. 3 is a partial plan view of the end of the cable sleeve of FIGS. 1 and 2 with a modified clamping rail.

In FIG. 3, a rail 4, which terminates flush with the end of the sleeve member 1, is provided. As illustrated, the pins 8 and 9, as well as the bolt 7, are shown with the bolt 7 extending across the gap between the two beads.

Figure 4:
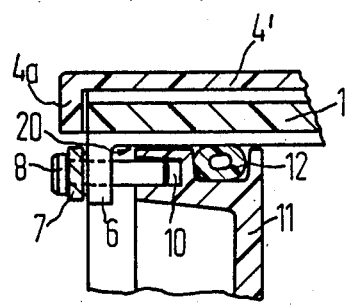
FIG. 4 is a cross sectional view taken along the lines IV—IV of FIG. 2.

In FIG. 4, the closing rail 4' is drawn onto the beads of the sleeve member, and this rail has an end stop 4a that merely presses against the end of the sleeve member 1 after the completion of the closing procedure. This end stop prevents a further, inadmissable draw-on of the closing rail 4'.

The pins 8 of the fixing means are anchored in the flange 6 and acts as a stiffening on the critical region that is embedded therearound. For example, the pin 8 can now be additionally anchored in a bore 10 of the end member 11, as illustrated. The end member 11, instead of a single bore 10, can have a groove, such as 10a of FIG. 2, which is circumferentially arranged, either for a portion or over the entire circumference, as illustrated in FIG. 1. The end member 11 also has a circumferential sealing groove in which a ring seal 12 is inserted for forming a seal relative to the sleeve member 1. The parting line between the sleeve member 1 and the sealing member 11 is to be viewed as the original possible transition point 20. As a result of the improvement of the present invention, however, a spreading in this region is no longer possible.

Figure 5:
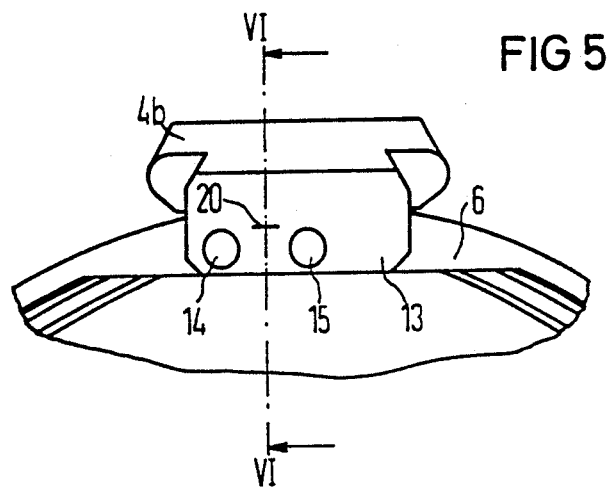
FIG. 5 is an end view of an embodiment of the cable sleeve in accordance with the present invention.

A second embodiment of the present invention is illustrated in FIG. 5 and has a closing rail 4b, which is provided with an end stop or stiffening element 13, which forms a part of the fixing means. This stiffening element or interlocking element 13 is a projection that extends perpendicularly from the plane of the closing rail 4b and is thereby lengthened to such an extent that the fixing means, which includes the pins 14 and 15, can be introduced into congruent holes in the flanges 6 lying therebehind. It must thereby be taken into consideration that in the preceeding example, the point of introduction of the pins 14 and 15 lie deeper than in the original possible transition point 20. In this way, the long edges are again fixed in the position that a separation in an outward direction is no longer possible.

Figure 6:
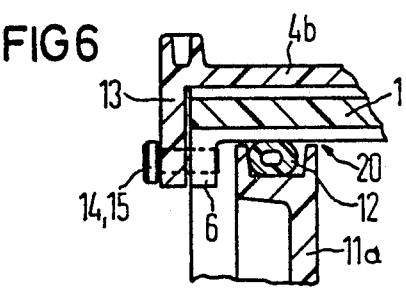
FIG. 6 is a cross sectional view taken along the lines VI—VI of FIG. 5.

As mentioned, the pins 14 and 15 extend through the projection 13 into the flanges 6, as best illustrated in FIG. 6. As illustrated, these pins 14 and 15 lie close to or adjacent the transition point 20. The end member 11a, unlike the end member 11 of FIG. 4, does not have any bore, depressions or grooves for receiving the ends of the pins, such as 14 and 15. As a result, the pins 14 and 15 have a length so they only penetrate through the flange 6, but not into the area of the end member 11a.

Figure 7:
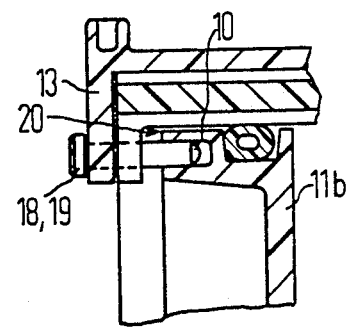
FIG. 7 is a cross sectional view similar to FIG. 6 showing a modification of the embodiment of FIGS. 5 and 6.

In the embodiment or modification of FIG. 7, the pins 18 and 19, which extend through the projection 13, also extend through the holes in the flange 6 and have a sufficient length to extend into bores, such as 10, of an end member 11b. Instead of bores, a circumferential groove or at least a partially circumferential groove can be provided. It should be noted that since the draw-on of the sleeve member onto the end members 11 is not compulsorily prescribed, at least in the circumferential direction, the location of the anchoring with the fixing means can be facilitated by utilizing at least a partially circumferential groove instead of the pair of bores.

Figure 8:
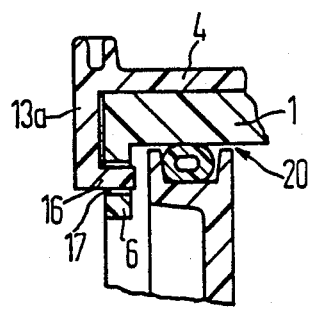
FIG. 8 is a cross sectional view similar to FIG. 6 showing another modification of the embodiment of FIGS. 5 and 6.
Figure 9:
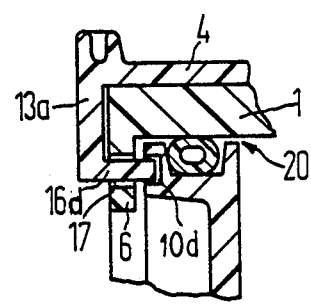
FIG. 9 is a cross sectional view similar to FIG. 6 showing still another modification of the embodiment of FIGS. 5 and 6.

Another modification is illustrated in FIG. 8. In this modification, a first projection 13a forms part of the fixing elements and has inwardly directed second projections 16. As illustrated, the second projections 16 extend through holes 17 in the flanges 6. Thus, when the closing rail 4c is moved to the end of the drawing on of the beads together, the anchoring of the flanges 6 of the sleeve member 1 will simultaneously occur. Thus, an additional work step of inserting the pins after applying the clamping rails is not needed. If desired and as illustrated in FIG. 9, the end member can be provided with a circumferential groove 10d for receiving the ends of the projections 16d, which are modified to have a greater length so as to extend into the groove 10d of the end member.

Although various minor modifications may be suggested by those versed in the art, it should be understood that we wish to embody within the scope of the patent granted hereon all such modifications as reasonably and properly come within the scope of our contribution to the art.

We claim:

1. In a cable sleeve having a pair of end members with annular seals, a sleeve member having a pair of longitudinal edges forming a longitudinally extending slot, and clamping means for pressing the pair of longitudinal edges into sealing engagement with each other as the sleeve member is sealed onto the seals of the pair of end members, the improvements comprising the sleeve member at each end of the slot having a pair of segment-like, inwardly projecting flanges in the region adjacent a parting line between said pair of the longitudinal edges and fixing means for engaging each pair of flanges including a stiffening element for extending across a gap between each pair of the flanges to hold the pair of flanges in a fixed position to prevent separation of the ends of the pair of longitudinal edges of the slot.

2. In a cable sleeve according to claim 1, wherein each flange has an opening, each end member has an end face with depressions facing an adjacent pair of flanges, and the fixing means at each end of the slot includes projections extending through openings in the flanges and into the depressions.

3. In a cable sleeve according to claim 1, wherein each flange has an opening, each end member has an end face with a partially circumferential groove facing an adjacent pair of flanges, and the fixing means at each end of the slot includes projecting members extending through openings in the flanges and into the partially circumferential groove.

4. In a cable sleeve according to claim 1, wherein each flange has an opening and an edge surface facing an edge surface of the other flange of the pair of flanges, the fixing means at each end of the slot includes a pair of pins extending into openings in said flanges and wherein the stiffening element is a bolt encompassed by both pins in a clamping fashion to hold the edge surfaces of the pair of flanges together to prevent separation thereof.

5. In a cable sleeve according to claim 4, wherein the bolt has one end rotatably seated on one pin of each pair of pins and a second end of the bolt is fashioned as an interlocking arcuate hook for partially surrounding the second pin of each pair of pins.

6. In a cable sleeve according to claim 5, wherein each end member has an end face with depressions facing the adjacent pair of flanges and each of the pins has a length to extend past the flange and into one of the depressions in the end face of the adjacent end member.

7. In a cable sleeve according to claim 5, wherein an outward face of each end member adjacent the pair of flanges has a partially circumferential groove aligned with the openings in the flanges and each of the pins extend beyond the flange and into said partially circumferential groove.

8. In a cable sleeve according to claim 4, wherein an outwardly facing surface of each of the end members has a partially circumferential groove aligned with the openings in the flanges, and said pins have a length to extend through said flanges and into said groove.

9. In a cable sleeve according to claim 4, wherein each end member has a surface with depressions and the pins have a length greater than the thickness of said flanges and extend into said depressions.

10. In a cable sleeve according to claim 1, wherein the stiffening element of the fixing means is an angular projection on a narrow end of a closing rail, said fixing means includes pins extending through said projection into openings in said flanges behind said projection.

11. In a cable sleeve according to claim 10, wherein each end member has a surface with depressions and the pins have a length to extend through the openings in the flanges and into said depressions.

12. In a cable sleeve according to claim 10, wherein each of the end members has a partially circumferential groove in an outwardly facing surface of the member aligned with the openings in the flanges, said pins having a length to extend through the flanges and into said partially circumferential groove.

13. In a cable sleeve according to claim 1, wherein the stiffening element is formed by a first projection extending at an angle from the narrow end of the closing rail, said fixing means further including a pair of second projections extending at a right-angle to said first projection and through openings in each of said adjacent flanges to hold said flanges in the closed position.

14. In a cable sleeve according to claim 13, wherein each end member has depressions facing the adjacent flanges and said second projections have a length to extend through said flanges and into depressions.

15. In a cable sleeve according to claim 13, wherein each end member on a surface facing the adjacent flanges has a partially circumferential groove aligned with the openings in said flanges and said second projections have a length to extend through said flanges and into said partially circumferential groove.

* * * * *